United States Patent [19]
Brown

[11] 3,971,579
[45] July 27, 1976

[54] WELD CLAMP SEAL

[76] Inventor: William A. Brown, 2418 W. 12th St., Odessa, Tex. 79760

[22] Filed: May 5, 1969

[21] Appl. No.: 821,731

[52] U.S. Cl. .............................. 285/353; 285/369; 285/404
[51] Int. Cl.² .......................................... F16L 19/07
[58] Field of Search ............. 138/99; 285/286, 353, 285/354, 369, 404

[56] References Cited
UNITED STATES PATENTS

| | | | |
|---|---|---|---|
| 618,587 | 1/1899 | Simmons | 285/369 X |
| 822,530 | 6/1906 | Lowe | 285/353 X |
| 1,494,693 | 5/1924 | Loi | 285/404 X |
| 1,794,905 | 3/1931 | Kass | 285/354 |
| 3,488,072 | 1/1970 | Allen et al. | 285/353 |

FOREIGN PATENTS OR APPLICATIONS

| | | | |
|---|---|---|---|
| 512,624 | 5/1955 | Canada | 138/99 |
| 862,532 | 1/1953 | Germany | 285/353 |
| 820,113 | 9/1959 | United Kingdom | 285/354 |

*Primary Examiner*—Werner H. Schroeder
*Attorney, Agent, or Firm*—Wendell Coffee

[57] ABSTRACT

A tubular device containing a flexible sealing means for temporarily or permanently sealing a severed or broken pipe which contains fluids under extremely high pressure. The tubular device is first attached around and the flexible sealing means is tightened by threads upon two halves of the tubular device and is held in place temporarily by set screws. If it is to form a permanent repair, the device may be held in place by welding the device to the pipe.

5 Claims, 4 Drawing Figures

U.S. Patent  July 27, 1976  3,971,579

INVENTOR.
William A. Brown

WELD CLAMP SEAL

This invention relates to sealing devices and more particularly to a device for sealing a ruptured pipe or connecting two pipes of equal diameter.

After a pipeline has been put into operation, it sometimes ruptures with jagged or irregular end surfaces or it is necessary to intentionally sever it with irregular end surfaces for various reasons. Thereafter, when it is necessary to place it back in operation, it is either too expensive to put in a new segment or it is too dangerous to weld it back together at that time. By my invention I have provided means for patching or splicing the pipeline without the necessity for welding. Of course, the patch, or splice, after having been installed may be welded to the pipeline to make it a permanent part thereof.

Accordingly, a principal object of my invention is to provide means for patching, or splicing, a pipeline.

Another object of my invention is to provide such patching, or splicing, means which do not require its being welded to the pipeline.

Yet another object of my invention is to provide such patching, or splicing, means which will function under high pressures.

Figure 1:
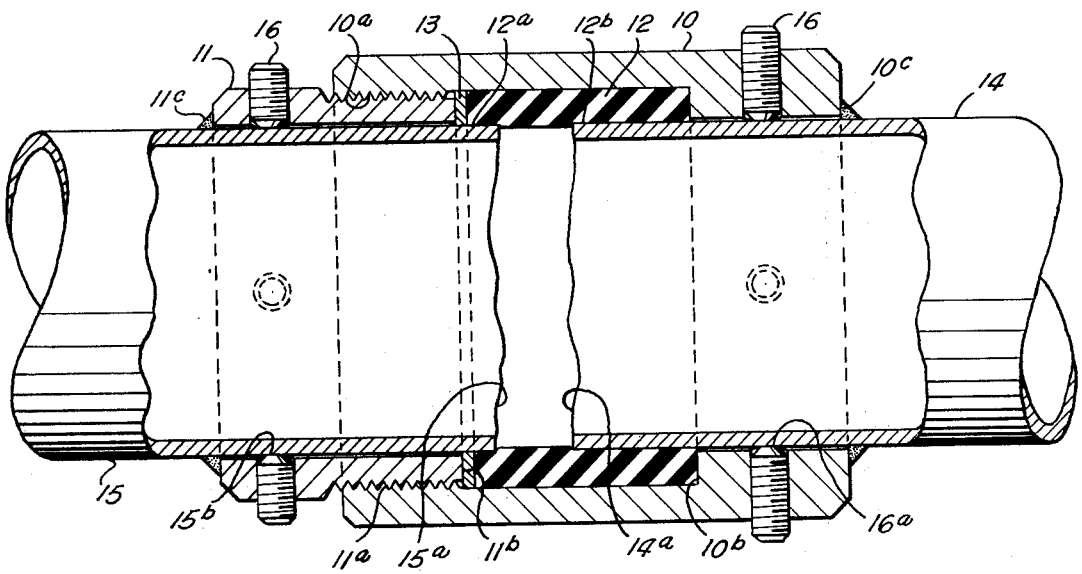

Additional objects will be apparent from a study of the following disclosure and attached claims in conjunction with the drawings, wherein:

FIG. 1 is an elevational view, in section, of my invention, a Weld Clamp Seal.

Figure 2:
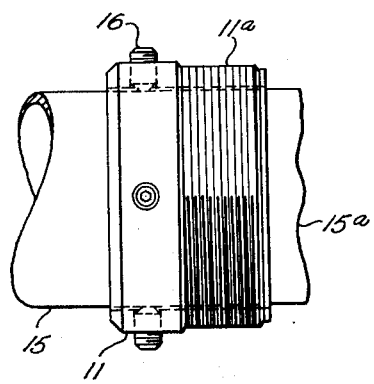
Figure 3:
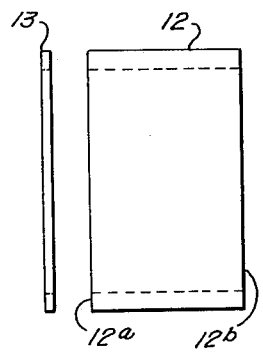
Figure 4:
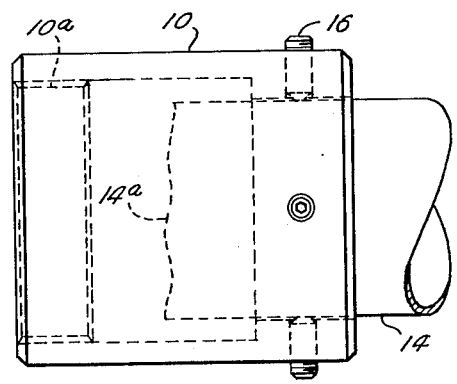

FIGS. 2, 3, and 4 comprise an exploded, schematic representation of my invention as it is being assembled on a pipeline.

Referring to FIG. 1, stationary sleeve 10 is secured to pipe 14 by a plurality of set screws 16 which securely hold sleeve 10 at a predetermined location on pipe 14 by abutting pipe 14 at 16a. Pipe 14 extends into sleeve 10 to such a distance shown at 14a.

Sleeve 10 is internally threaded at 10a for threaded engagement with compression sleeve 11 which is externally threaded at 11a.

Sleeve 11 is secured to pipe 15 by a series of set screws 16 which abut pipe 15 at 15b in the same manner in which sleeve 10 is secured to pipe 14.

When my Weld Clamp Seal is thus secured on and around pipes 14 and 15 as just described, the pipes will not move in relation to each other.

Sleeve 10 contains right angle a radial shoulder 10b. Between this shoulder 10b and radial end face 11b of sleeve 11, when in the position shown in FIG. 1, a flexible, compressible ring 12 and a compression ring 13 are positioned. When sleeve 11 was screwed into sleeve 10, end 11b of sleeve 11 forced ring 13 against compressible ring 12 in such manner as to cause ring 12 to abut shoulder 10b and to seal the interfaces 12b and 12a between ring 12 and pipes 14 and 15, respectively.

After the assembly has been completed as just described, sleeves 10 and 11 may be permanently secured to pipes 14 and 15, respectively, by welding as showing at 10c and 11c. However, such welding is not necessary since the assembly just described, without the welding, has been found to withstand pressures of up to 1125 psig within pipes 14 and 15 without leaking.

In order to assemble my Weld Clamp Seal on a pipe 14–15 which has been severed, it is necessary to separate the ends 14a and 15a of the two sections of pipe. Then, sleeve 10 is inserted over and around pipe 14 to the position shown in FIG. 4. Then, compressible ring 12 is inserted in sleeve 10 to the position shown in FIG. 1, after which compression ring 13 is inserted in sleeve 10 to the position shown in FIG. 1.

After this assembly has been made, sleeve 10 is positioned on pipe 14 to the position shown in FIG. 1 and set screws 16 are used to secure sleeve 10 on pipe 14. This is done by simply screwing the set screws into sleeve 10 until they securely abut pipe 14.

Of course, rings 12 and 13 are distinct units as shown in FIG. 3. However, they can be assembled in sleeve 10 prior to positioning sleeve 10 on pipe 14.

As shown in FIG. 2, sleeve 11 is positioned around the opposing portion of pipe 15 which is inserted into sleeve 11 to the position shown at 15a in FIG. 1. It is necessary that the ends 14a and 15a of the pipes be positioned within ring 12.

After sleeve 11 has been placed on pipe 15 the two pipes 14 and 15 are brought back into alignment for the insertion of sleeve 11 into sleeve 10.

Now, sleeve 11 is threadedly connected to sleeve 10 to the position shown in FIG. 1. When in this position end 11b of sleeve 11 has abutted ring 13 and compressed ring 12 to the extent that the interfaces 12a and 12b of sleeve 12 and pipes 15 and 14, respectively, are effectively sealed.

As mentioned above, if the connection is to be for a short time, welding of the sleeves to the pipes 14 and 15 as described above is not necessary. Otherwise, welding of the sleeves to the pipes can now be performed without danger from any gas in the pipes.

From the foregoing it is seen that by my invention I have provided means for patching, or splicing, a pipeline.

It is further seen that by my invention I have provided such patching, or splicing, means which do not require its being welded to the pipeline.

It is also seen that by my invention I have provided such patching, or splicing, means which will function under high pressures.

It is to be understood that the form of the invention shown and described herein is to be taken as a preferred embodiment of the same and that various changes in the shape, size, and arrangement of parts may be resorted to without departing from the spirit of the invention or the scope of the attached claims.

Having described my invention what I claim and desire to secure by Letters Patent is:

1. A weld clamp for sealing off any leakage of fluid contained in a metal pipeline when same is severed with ragged end faces comprising:
   a. a stationary sleeve adapted to be telescoped over a first end portion of said pipeline and extend over a second end portion of said pipeline where same was severed,
   b. a plurality of set screws extending through said stationary sleeve for securely connecting it to the first end portion,
   c. a radial right angled shoulder in the stationary sleeve,
   d. internal threads in the stationary sleeve,
   e. a compression sleeve having a radial right angled end face adapted to be telescoped over the second end portion of said pipeline,
   f. a plurality of setscrews extending through said compression sleeve for securing it to the second end portion, g. external threads on the compression sleeve screwed into the internal threads of the stationary sleeve, and h. a compressible ring in the stationary sleeve extending from the radial right angled shoulder in the stationary sleeve to the radial right angled end face of the compression sleeve and adapted to compress upon both the first end portion and the second end portion of said severed pipeline to form a fluid seal with each.

2. The invention as defined in claim 1 with an additional limitation of:

j. a compression ring between the end of the compression sleeve and the compressible ring.

3. The invention as defined in claim 1 wherein j. said clamp is on a pipeline severed with irregular ends and k. said stationary sleeve is welded to said first end portion and m. said compression sleeve is welded to said second end portion.

4. The invention as defined in claim 3 with an additional limitation of:

n. a compression ring between the end of the compression sleeve and the compressible ring.

5. The invention as defined in claim 4 wherein the compressible ring is compressed upon both ends of the pipeline.

* * * * *